US008636398B2

(12) United States Patent
Chiba (10) Patent No.: US 8,636,398 B2
(45) Date of Patent: *Jan. 28, 2014

(54) ROOM LAMP FOR MOTOR VEHICLE (75) Inventor: Shingo Chiba, Makinohara (JP)

(73) Assignee: Yazaki Corporation, Tokyo (JP)

( * ) Notice: Subject to any disclaimer, the term of this patent is extended or adjusted under 35 U.S.C. 154(b) by 33 days.

This patent is subject to a terminal disclaimer.

(21) Appl. No.: 13/160,958

(22) Filed: Jun. 15, 2011

(65) Prior Publication Data

US 2011/0310632 A1  Dec. 22, 2011

(30) Foreign Application Priority Data

Jun. 16, 2010 (JP) ................................. 2010-137158

(51) Int. Cl.
| B60Q 1/00 | (2006.01) |
| B60Q 3/00 | (2006.01) |
| B60Q 1/26 | (2006.01) |
| B60Q 11/00 | (2006.01) |
| F21V 21/00 | (2006.01) |
| F21V 21/08 | (2006.01) |

(52) U.S. Cl.
USPC ............ 362/549; 362/396; 362/490; 362/493

(58) Field of Classification Search
USPC ......... 362/459, 487, 488, 306, 374, 479, 490, 362/549, 365, 396; 24/458, 581.11
See application file for complete search history.

(56) References Cited

U.S. PATENT DOCUMENTS

| 1,589,760 | A | * | 6/1926 | Kuen ............................ 362/374 |
| 4,969,072 | A | * | 11/1990 | Pye ............................... 362/549 |
| 6,250,787 | B1 | * | 6/2001 | Matubara ...................... 362/520 |
| 6,749,324 | B2 | * | 6/2004 | Nagai et al. ................... 362/490 |
| 7,287,890 | B2 | * | 10/2007 | Okabe et al. .................. 362/548 |
| 2004/0252514 | A1 | | 12/2004 | Okabe et al. |

FOREIGN PATENT DOCUMENTS

| DE | 10 2004 028 347 A1 | 1/2005 |
| JP | 2005-001459 A | 1/2005 |

OTHER PUBLICATIONS

Office Action, dated Oct. 1, 2013, issued by the German Patent Office in counterpart German Patent Application No. 10 2011 077 616.8.

* cited by examiner

Primary Examiner — Jong-Suk (James) Lee
Assistant Examiner — Erin Kryukova
(74) Attorney, Agent, or Firm — Sughrue Mion, PLLC (57) ABSTRACT A room lamp for a motor vehicle, including a lamp assembly having a resin clip; a vessel having an opening; and a reinforcing member. The resin clip is engaged with a peripheral edge of the reinforcing member through the opening of the vessel to integrally attach the lamp assembly, the vessel and the reinforcing member. The resin clip has an inverted U shape, is made of an elastic member and includes a base part, an inverted U shape part and a lock. The resin clip has a protruding piece in a lower part of the lock, a side protruding piece formed in a lower part side of the protruding piece which is located in an engaging recessed part of an opening peripheral edge of the vessel which has a clip abutting surface when the resin clip is engaged with the peripheral edge of the reinforcing member.

3 Claims, 9 Drawing Sheets

ROOM LAMP FOR MOTOR VEHICLE

BACKGROUND OF THE INVENTION

1. Field of the Invention

The present invention relates to a room lamp for a motor vehicle and more particularly to a room lamp for a motor vehicle in which a metal mold structure can be simplified to decrease a cost and an accurate attached state can be maintained that a resin clip used for an attachment is prevented from being inclined after the attachment, so that a housing is not hung, nor excessively displaced.

2. Description of the Related Art

Usually, for attaching a room lamp to a ceiling of a vehicle room, a room lamp for a moor vehicle as disclosed in patent literature 1 is known (see patent literature 1).
Patent Literature 1: JP-A-2005-1459

An attaching structure of a lamp unit disclosed in the patent literature 1 can simply and assuredly attach the lamp unit and an interior wall material to a vehicle body panel at the same time. Specifically, a fixing unit that fixes mutually a room lamp and a reinforcing member is suspended in a reinforcing member side of a holder. A flexible arm is bent in an inverted U shape and has an end part engaged with an attaching part of the reinforcing member and a flexible arm regulating part arranged in a side part of the flexible arm and engaged with a support piece of the flexible arm to restrain the end part from being displaced along a direction for attaching and detaching the room lamp relative to a vehicle body.

According to the attaching structure disclosed in the patent literature 1, the end part of the flexible arm can assuredly attach a module to the vehicle body panel. Further, since the end part of the flexible arm is not recessed to an inner side of a vehicle along the direction for attaching and detaching the lamp unit to the vehicle body during an attachment to the vehicle body, an excessive clearance that estimates the recess does not need to be set relative to an attaching part of the vehicle body panel. Further, even when the fixed module receives a strong external force toward the inner side of the vehicle relative to the vehicle body panel, the flexible arm is effectively prevented from being disengaged.

In order to form the flexible arm in the attaching structure of the patent literature 1, a slide structure is required in a metal mold, which increases a cost.

SUMMARY OF THE INVENTION

The present invention is devised to solve the above-described demerit and it is a first object of the present invention to decrease a cost by manufacturing a configuration without using a metal mold of a slide structure It is a second object of the present invention to provide a room lamp for a motor vehicle in which an accurate attached state can be maintained that a resin clip (below-described) used for an attachment is prevented from being inclined after the attachment, so that a housing is not hung, nor excessively displaced.

This invention of a first invention is provided with a room lamp for a motor vehicle including: a lamp assembly having a resin clip; a vessel having an opening; and a reinforcing member, wherein the resin clip is engaged with a peripheral edge of the reinforcing member through the opening of the vessel to integrally attach the lamp assembly, the vessel and the reinforcing member, the resin clip is formed generally in an inverted U shape, made of an elastic member and includes a base part connected to a housing, an inverted U shape part connected to the base part and a lock connected to the inverted U shape part, the resin clip has a protruding piece in a lower part of the lock, a side protruding piece is formed in a lower part side of the protruding piece and the protruding piece is located in an engaging recessed part of an opening peripheral edge of the vessel which has a clip abutting surface under a state the resin clip is engaged with the peripheral edge of the reinforcing member.

This invention of a second invention is provided with a room lamp for a motor vehicle, wherein the side protruding piece is located in a lower side of an arm forming the engaging recessed part.

This invention of a third invention is provided with a room lamp for a motor vehicle, wherein the clip abutting surface is formed in the lower side of the arm.

This invention of a fourth invention is provided with a room lamp for a motor vehicle, wherein the clip abutting surface is a part of the engaging recessed part opposed to the protruding piece.

As described above, according to the present invention, since the metal mold having the slide structure is not used, the cost is lowered and the room lamp for a motor vehicle is obtained in which an accurate attached state can be maintained that a resin clip used for an attachment is prevented from being inclined after the attachment, so that a housing is not hung, nor excessively displaced (below-described).

BRIEF DESCRIPTION OF THE DRAWINGS

FIGS. 4 (A) and (B) are diagrams for explaining a resin clip according to the present invention in which a housing is not hung.

FIGS. 5(A) to 5(D) are longitudinally sectional views for explaining processes until a lock of the resin clip is engaged with an opening peripheral edge of the reinforcing member.

FIGS. 6(A) to (C) are perspective views showing an exemplary embodiment in which a recessed part is provided in an opening peripheral edge of a vessel with which a side protruding piece is engaged.

FIGS. 7 (A) and (B) are diagrams for explaining one of resin clips provided in four corners of a housing according to the invention of a related art.

FIGS. 9 (A) and (B) are longitudinally sectional views for explaining a state that a lock of the resin clip shown in FIG. 7 is engaged with an opening peripheral edge of a reinforcing member.

DESCRIPTION OF THE PREFERRED EMBODIMENTS

Now, a room lamp for a motor vehicle will be described below in which a metal mold having a slide structure is managed not to be used to lower a cost and a housing is not hung (below-described) after a lamp assembly is attached to a vehicle body.

<Structure of Room Lamp for Motor Vehicle According to the Present Invention>

Figure 1:
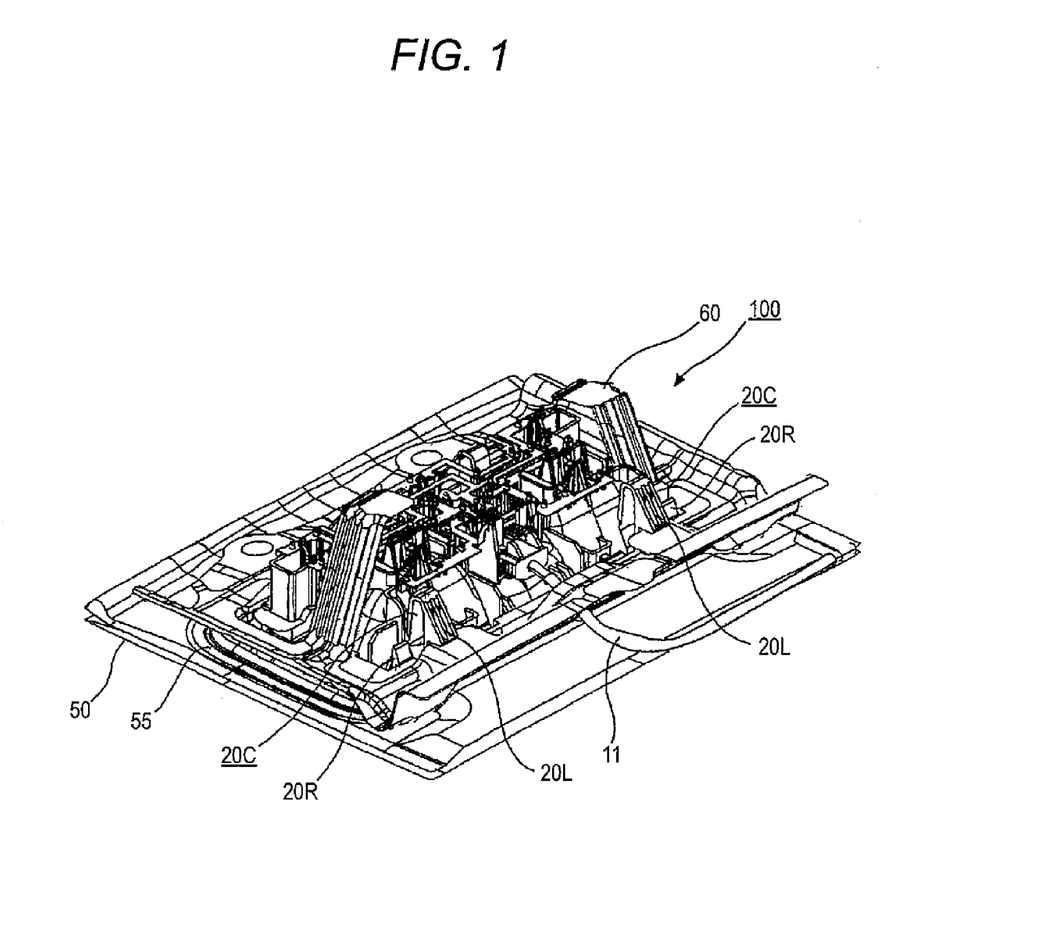
FIG. 1 is a perspective view of a room lamp for a motor vehicle attached to a vehicle.
Figure 2:
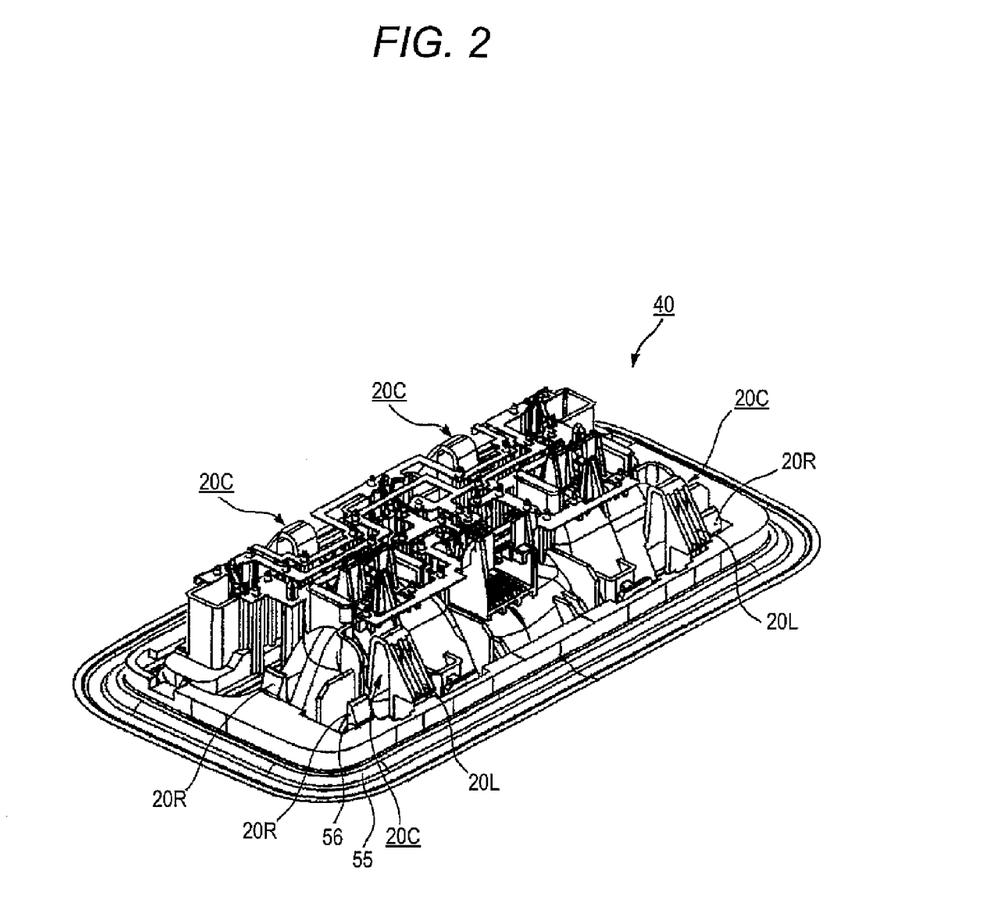
FIG. 2 is a perspective view of a lamp assembly formed with a rest having a connector and a reinforcing member removed from the room lamp for the motor vehicle shown in FIG. 1.
Figure 3:
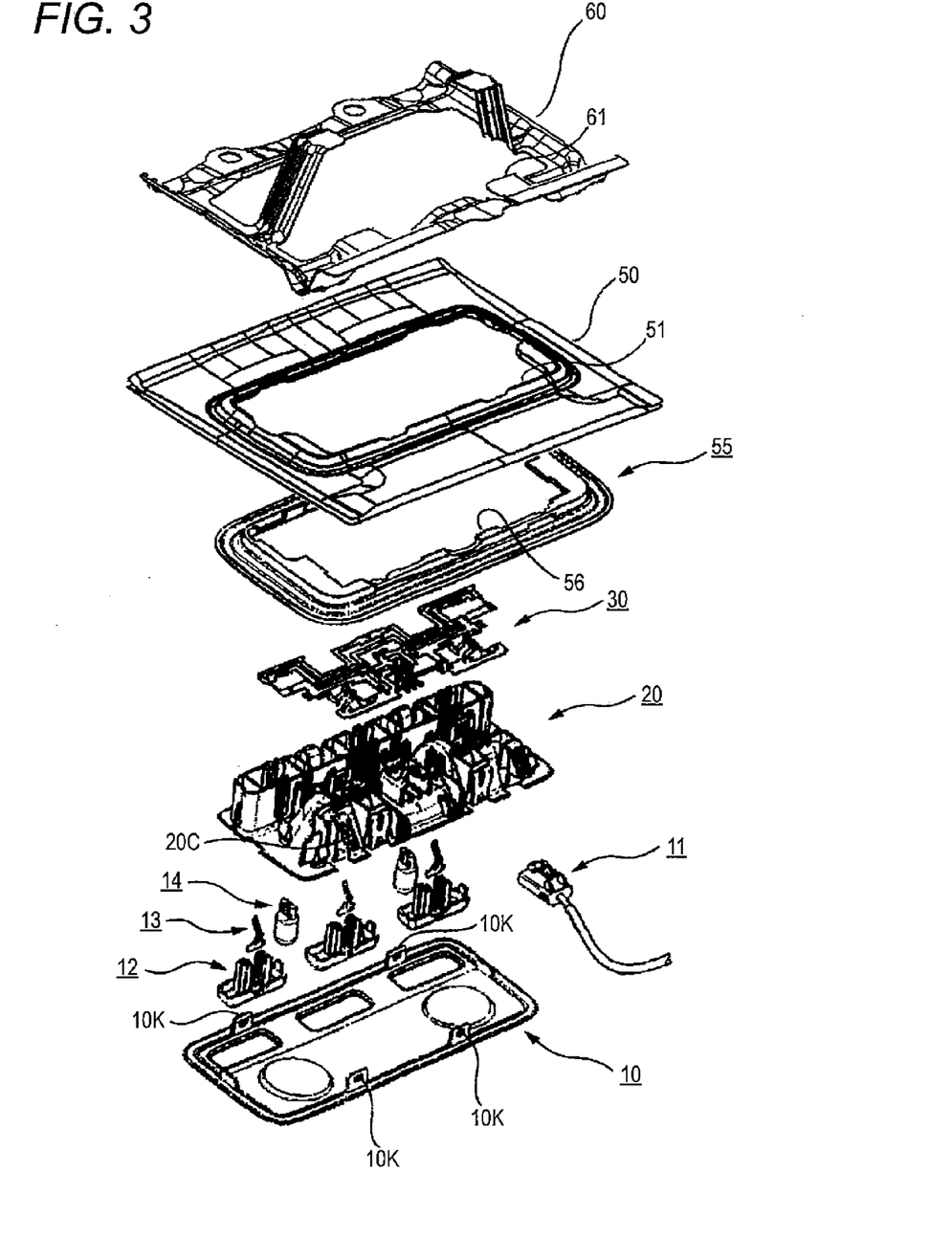
FIG. 3 is an exploded perspective view of the room lamp for the motor vehicle shown in FIG. 1.

FIG. 1 is a perspective view of a room lamp 100 for a motor vehicle attached to a vehicle. FIG. 2 is a perspective view of a lamp assembly formed with a rest having a connector and a reinforcing member removed from the room lamp for the motor vehicle shown in FIG. 1. FIG. 3 is an exploded perspective view of the room lamp for the motor vehicle shown in FIG. 1.

In FIGS. 1 to 3, a lamp assembly 40 (FIG. 2) is integrally attached in which a switch knob 12 (FIG. 3), a contact 13 (FIG. 3) and a bulb 14 (FIG. 3) are attached to a housing 20 shown in FIG. 3, an electrically connected bus bar 30 (FIG. 3) is fitted thereto from an upper part to form a lamp functional part, a lens 10 (FIG. 3) forming a design part is fitted to the housing 20 from a lower part, and engaging pieces 10K (FIG. 3) provided in four positions on a peripheral edge of the lens 10 are engaged with corresponding engaging parts of the housing 20.

In the room lamp 100 (FIG. 1) for attachment to the motor vehicle, engaging arms 20R (FIG. 2) of the lamp assembly 40 (FIG. 2) are engaged with an opening peripheral edge 56 (FIG. 2) of a vessel 55 (FIG. 2) to attach the lamp assembly 40 to the vessel 55. Then, as shown in FIG. 5 described below, resin clips 20C are engaged with an opening peripheral edge 51 of a roof panel 50. Then, a connector 11 (FIG. 3) is fitted to a connecting part of the housing 20 to form a roof module. Further, the resin clips 20C (FIG. 2, FIGS. 4(A) and (B)) are used to attach the roof module to a reinforcing member 60 (FIG. 3, FIGS. 4 (A) and (B)) of a vehicle main body side in such a way as described below, so that the room lamp 100 (FIG. 1) attachment to the vehicle is completed. Namely, in the room lamp 100 (FIG. 1) for attachment to the motor vehicle, the lamp assembly 40 (FIG. 2) to which the vessel 55 (FIG. 2) is already attached by the engaging arms 20R (FIG. 2) is allowed to come close to the roof panel 50 from a lower part to engage (primarily engage) the resin clips 20C of the housing 20 with the opening peripheral edge 51 of the roof panel 50 (FIGS. 5(A) and 5(B)) to form the roof module. Then, this roof module is allowed to come close to the reinforcing member 60 (FIG. 5(C)) from a lower part thereof to engage (secondarily engage) the resin clips 20C (FIG. 2) of the housing 20 with an opening peripheral edge 61 of the reinforcing member 60. The resin clip 20C designates a resin clip obtained by the present invention and a resin clip according to the invention of the related art before the resin clip 20c is obtained has a form shown by reference numeral 20C' in FIG. 7.

<Resin Clip 20C'>

Figure 7A:
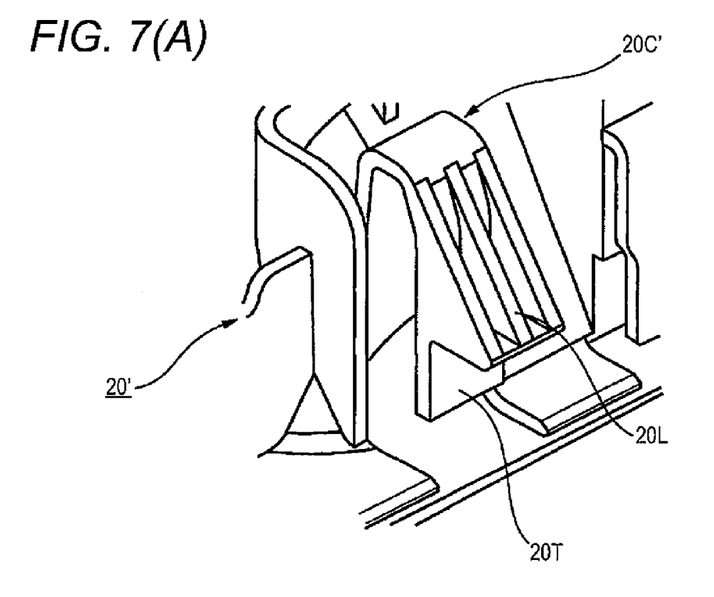
FIG. 7(A) is a perspective view and FIG. 7(B) is a longitudinally sectional view.
Figure 7B:
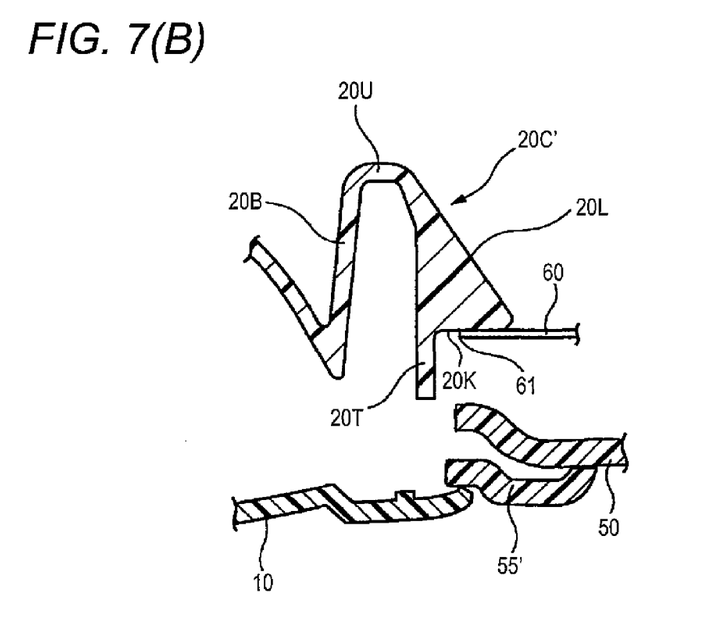

FIGS. 7(A) and (B) are explanatory views of a resin clip 20C' according to the invention of the related art. FIG. 7(A) is a perspective view and FIG. 7(B) is a longitudinally sectional view. In FIG. 7, reference numeral 20' designates a housing and 20C' designates one of resin clips formed in four corners of the housing 20'. As shown in the longitudinally sectional view in FIG. 7(B), the resin clip 20C' includes a base part 20B connected to the housing 20', an inverted U shape part 20U connected to the base part 20B, a lock 20L connected to the inverted U shape part 20U to form a hook 20K and a protruding piece 20T formed in a lower part of the lock 20L. Thus, the resin clip 20C' forms a spring formed generally in an inverted U shape and having an elasticity due to the elasticity of a resin itself.

<Attachment by Resin Clip 20C'>

Figure 8:
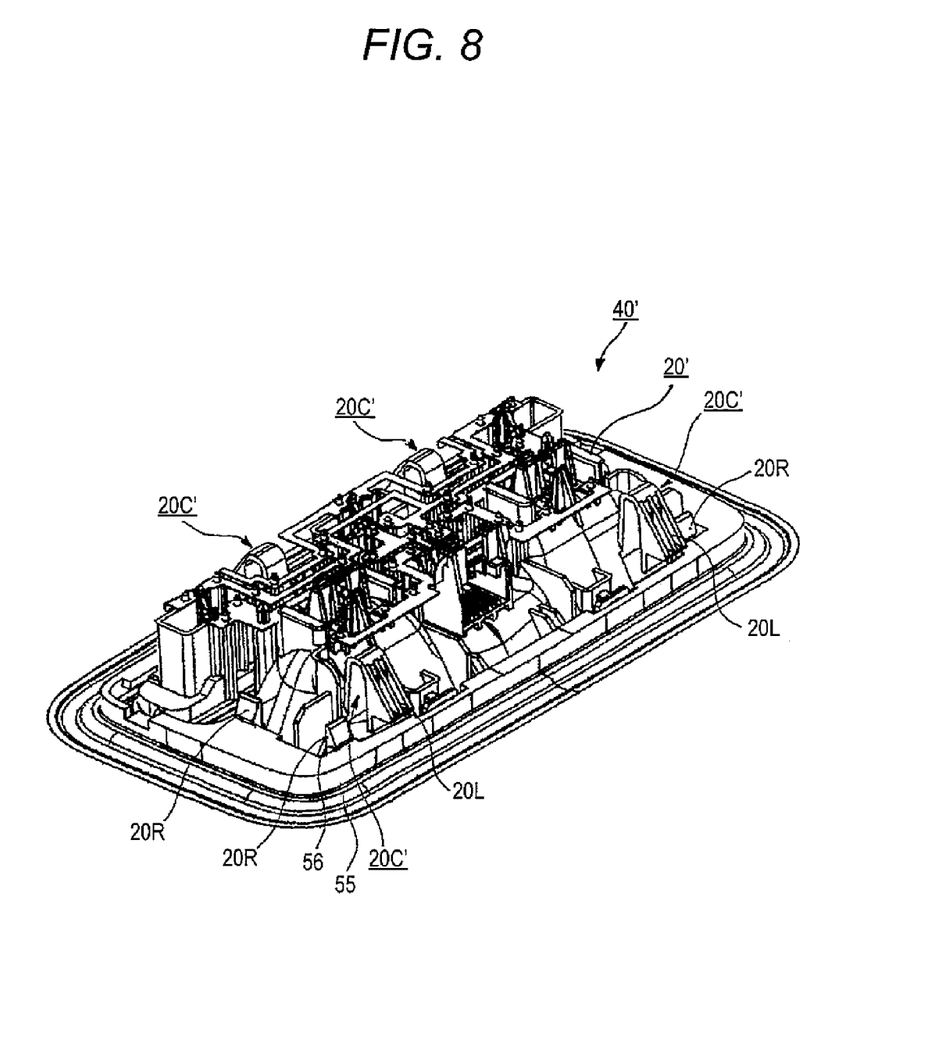
FIG. 8 is a perspective view of a lamp assembly according to the invention of the related art.

The resin clip 20C' is formed with an elastic material and provided at four corners of the housing 20' of a lamp assembly 40' shown in FIG. 8. When the locks 20L of the four resin clips 20C' (FIGS. 7 (A) and (B)) are respectively pushed upward to an opening peripheral edge 61 of a reinforcing member (FIG. 7(B)) from a lower part, the locks 20L get over the opening peripheral edge 61 of the reinforcing member 60 due to the elasticity of inclined parts thereof and the resin clips 20C' so that the hooks 20K of the locks 20L are engaged with the opening peripheral edge 61 of the reinforcing member 60. Thus, the lamp assembly 40' (FIG. 8) including the housing 20' is attached to the reinforcing member 60 under a state shown in FIG. 7(B).

<Problem of Resin Clip 20C'>

Figures 9A, 9B:
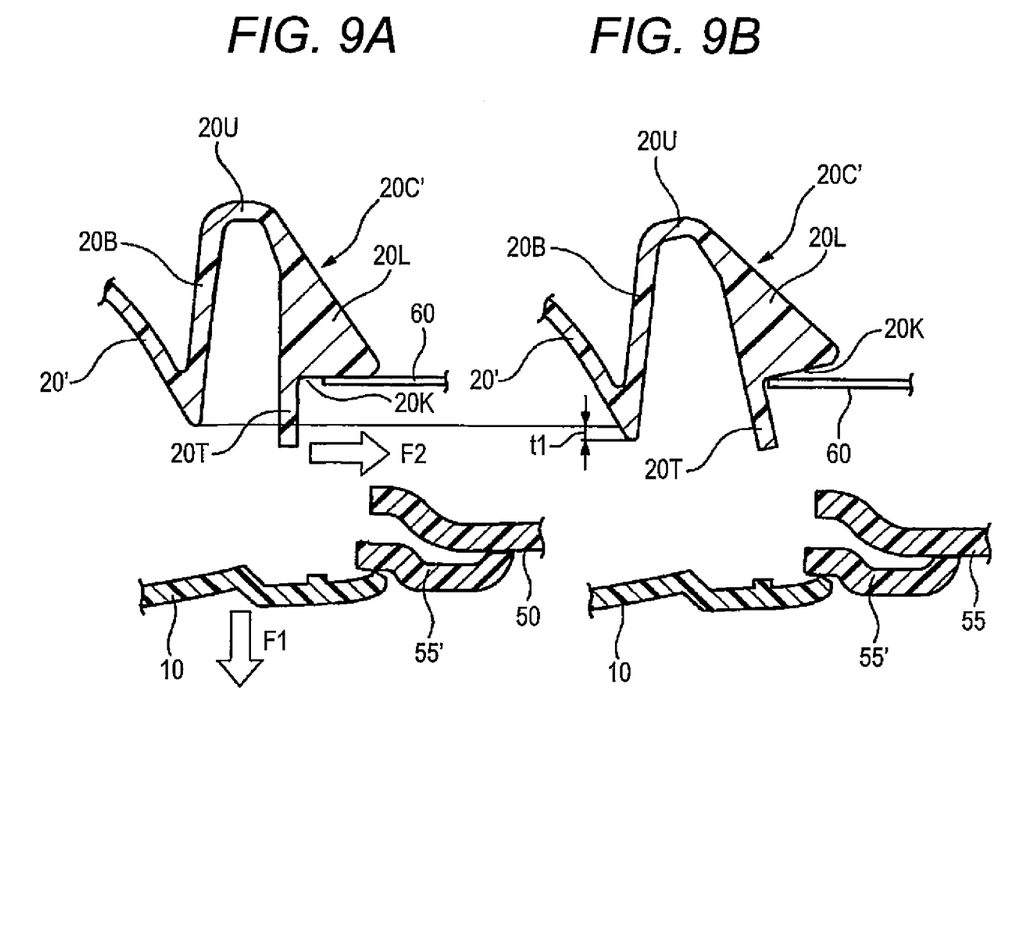
FIG. 9(A) is a view showing a state of a secondary engagement and FIG. 9(B) is a view for explaining a reason that the housing is hung.

However, in the lamp assembly 40' attached in such a way, when a force is applied in a downward direction F1 (FIG. 9(A)) due to its tare weight, the protruding pieces 20T of lower end parts of the locks 20L of the resin clips 20C' move in a direction F2 shown in FIG. 9(A). As a result, the housing 20' (FIG. 8) is hung by a distance t1 as shown in FIG. 9(B), so that there is a fear that an accurate attaching state cannot be maintained.

<Second Object of the Present Invention>

The present invention is devised to solve the above-described problem and it is a second object of the present invention to provide a room lamp for a motor vehicle in which even when a lower end part of a resin clip is to be opened outward due to the tare weight of a lamp assembly after an attachment, the lower end part of the resin clip is prevented to be opened so that a housing is not hung.

<Form of Resin Clip 20C According to the Present Invention>

Figure 4A:
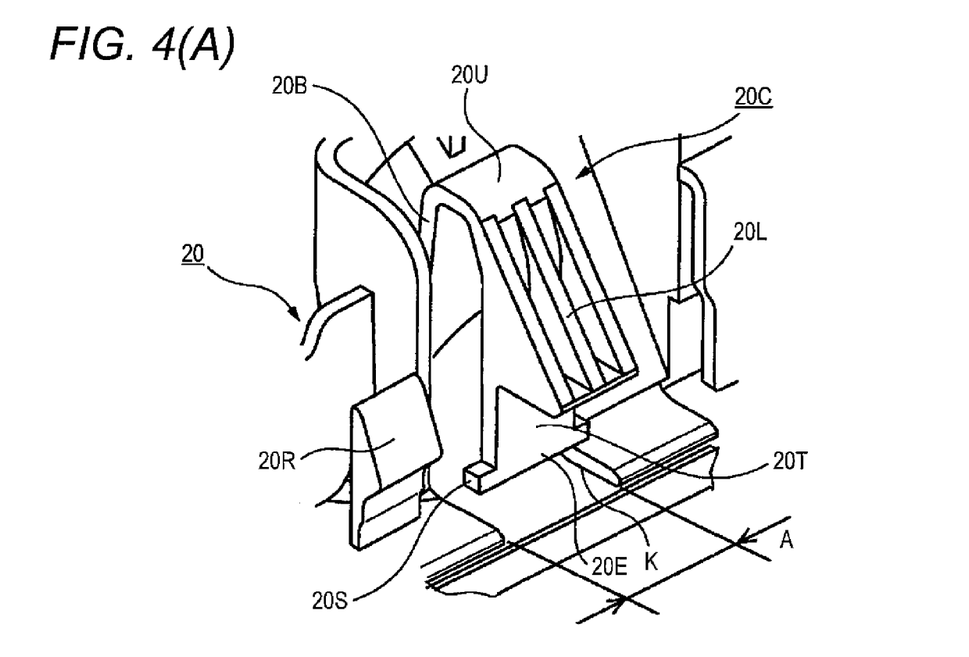
FIG. 4(A) is a perspective view and FIG. 4(B) is a longitudinally sectional view.
Figure 4B:
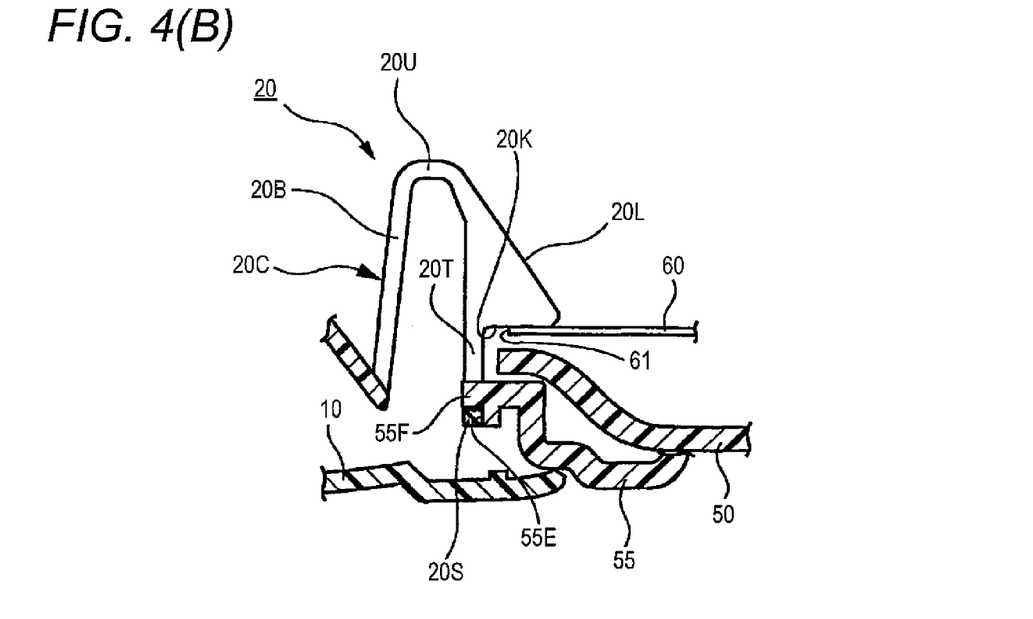

FIGS. 4 (A) and (B) are diagrams for explaining the resin clip 20C according to the present invention in which the housing is not hung. FIG. 4(A) is a perspective view and FIG. 4(B) is a longitudinally sectional view.

In FIGS. 4 (A) and (B), reference numeral 20 designates the housing of the present invention and 20C designates a resin clip located in a left front part of the resin clips formed in four corners of the housing 20 (FIG. 2).

As can be understood from the longitudinally sectional view shown in FIG. 4(B), the resin clip 20C according to the present invention includes a base part 20B connected to the housing 20, an inverted U shape part 20U connected to the base part 20B, a lock 20L connected to the inverted U shape part 20U to form a hook 20K, a protruding piece 20T formed in a lower part of the lock 20L and a side protruding piece 20S formed in a side surface in a direction traversing a direction of length of the protruding piece 20T.

The resin clip 20C of the present invention shown in FIGS. 4 (A) and (B) is different from the resin clip 20C' of the invention of the related art shown in FIG. 7 from the viewpoint that the side protruding piece 20S is formed in the direction traversing the direction of length of the protruding piece 20T.

<Form of Vessel 55 According to the Present Invention>

Figure 5A:
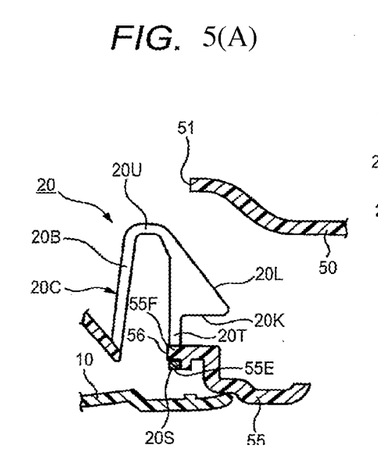
FIG. 5(A) is a view showing a state before a primary engagement with a roof panel.
Figure 5B:
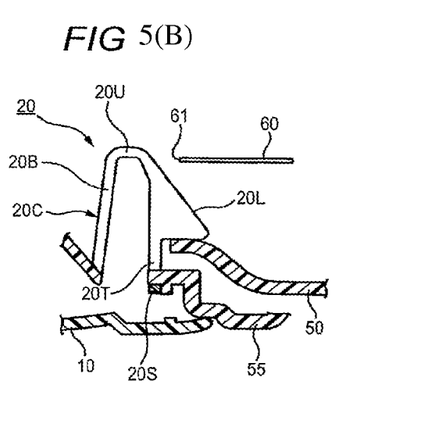
FIG. 5(B) is a view showing a state of the primary engagement with the roof panel.
Figure 5C:
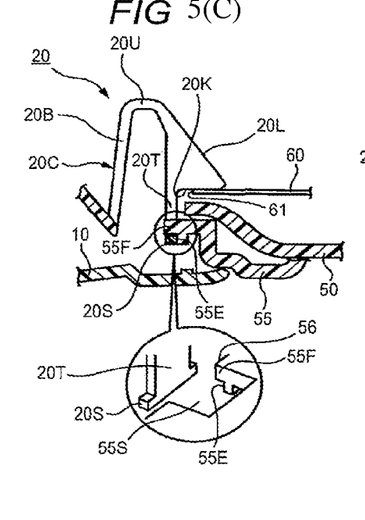
FIG. 5(C) is a view showing a state of a secondary engagement with the reinforcing member and FIG. 5(D) is a view for explaining a reason that the housing is not hung.

In the opening peripheral edge 56 (FIG. 3) of the vessel 55 according to the present invention, an engaging recessed part 55S (see a spout of FIG. 5(C)) is formed in which a free end side of the protruding piece 20T of the resin clip 20C is accommodated under a state that the lamp assembly 40 (the lens 10+the housing 20+the bus bar 30 or the like) is attached to the vessel 55. The width of the engaging recessed part 55S is larger than a breadth of the protruding piece 20T and the depth of the recessed part is set to the thickness of the protruding piece 20T or larger. An upward displacement is regulated by both arms 55F and the protruding piece 20T.

Further, in a lower side of both the arms 55F of the vessel 55 forming the engaging recessed part 55S, a clip abutting surface 55E is provided on which the protruding piece 20T of the resin clip 20C abuts to regulate a transverse displacement of the resin clip 20C.

<Structure which does not Require Metal Mold of Slide Structure>

The resin clip 20C (FIGS. 4(A) and (B)) is integrally formed within a range of a dimension A of a cut-out part K (FIG. 4(A)) of the housing 20.

Accordingly, only upper and lower metal molds may be used to form the resin clip without using a slide.

<Attachment to Roof Panel 50 and Reinforcing Member 60 by Resin Clip 20C>

Figure 5D:
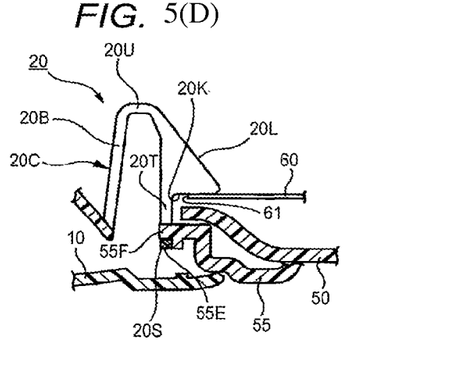

FIGS. 5(A) to 5(D) are longitudinally sectional views for explaining a procedure for attaching the resin clip 20C to the roof panel 50 and the reinforcing member 60. FIG. 5(A) is a diagram for explaining a state before the attachment of the resin clip to the roof panel 50, FIG. 5(B) is a diagram for explaining a primary engagement with the roof panel 50, FIG. 5(C) is a diagram for explaining a secondary engagement with the reinforcing member 60 and FIG. 5(D) is a diagram for explaining a prevention of a hung state.

<<Primary Engagement: Attachment to Roof Panel 50>>

When the lock 20L of the resin clip 20C (FIG. 5(A)) is allowed to come close to an upper part from a lower part of the roof panel 50 as shown in FIG. 5(A), the lock 20L gets over the opening peripheral edge 51 of the roof panel 50 due to an inclined surface and an elasticity to engage (primarily engage) the hook 20K (FIG. 5(A)) of the resin clip 20C with the opening peripheral edge 51 as shown in 5(B). Thus, the roof module is obtained.

<<Secondary Engagement: Attachment to Reinforcing Member 60>>

Then, in order to attach the roof module to a ceiling of the vehicle, when the roof module is lifted upward, the lock 20L gets over the opening peripheral edge 61 of the reinforcing member 60 FIG. 5(B)) due to the inclined surface and the elasticity to engage (secondarily engage) the hook 20K (FIG. 5(C)) of the resin clip 20C with the opening peripheral edge 61 of the reinforcing member 60 as shown in (FIG. 5(C)).

At this time, the protruding piece 20T (FIG. 5(3) of the resin clip 20C (FIG. 5(3)) is located in the engaging recessed part 55S (see the spout shown in FIG. 5(C)) of the vessel 55 (FIG. 5(C)). Accordingly, even when the lamp assembly 40 is to be hung downward due to its tare weight, since the protruding piece 20T abuts on the clip abutting surface 55E, an outward (transverse) displacement of the resin clip 20C is regulated and an upward displacement is regulated by both the arms 55F at the same time. Accordingly, the lamp assembly 40 is firmly attached to the reinforcing member 60.

<<Other Exemplary Embodiment: Protruding Piece 20T is Engaged With Both Arms 55F' of Recessed Part>>

Figure 6A:
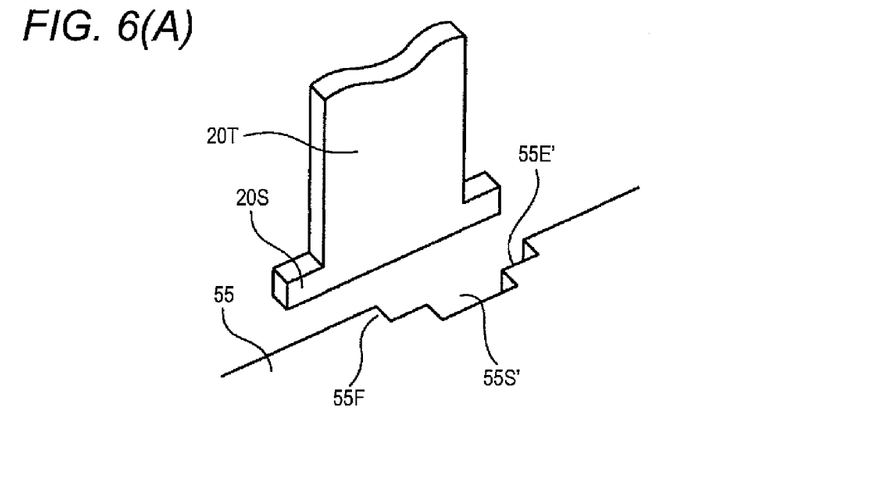
FIG. 6(A) is a view before an engagement.
Figure 6B:
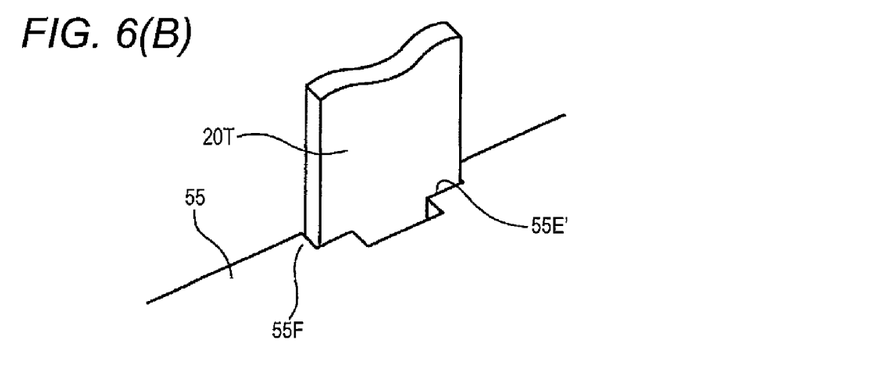
FIG. 6(B) is a first exemplary embodiment showing an engaged state and FIG. 6(C) is a second exemplary embodiment showing an engaged state.
Figure 6C:
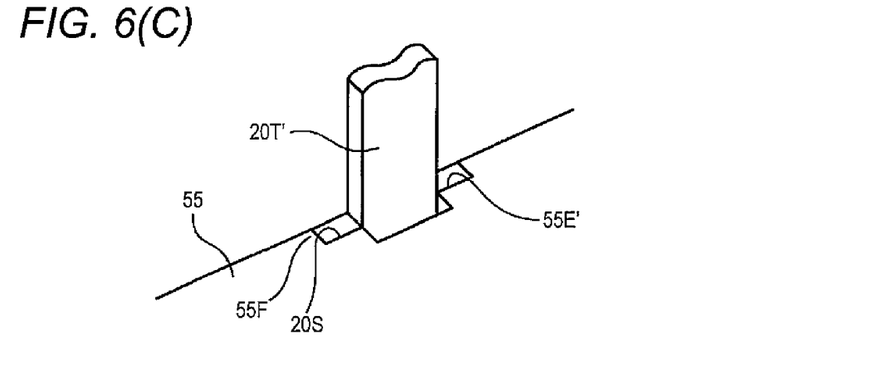

The side protruding piece 20S is engaged with the clip abutting surface 55E, however, the side protruding pieces 20S may be engaged with both arms 55F'of a recessed part as shown in FIG. 6 (C).

<Another Exemplary Embodiment Having Protruding Piece 20T Engaged>

FIGS. 6 (A) to (B) are exemplary embodiments in which a protruding piece 20T is engaged with a clip abutting surface 55E' of an engaging recessed part 55S' of a vessel 55. In FIG. 6(A) showing a state before an engagement, a side protruding piece 20S is formed in the protruding piece 20T of the resin clip 20C (FIG. 4). On the other hand, in an opening peripheral edge of the vessel 55, the engaging recessed part 55S' having the clip abutting surface 55E' is formed on which an upper part of the side protruding piece 20S abuts. The upper part of the side protruding piece 20S abuts on the clip abutting surface 55E' of the engaging recessed part 55S' formed in the opening peripheral edge of the vessel 55 so that the side protruding piece 20S passes through a lower part of the engaging recessed part 55S'. Thus, the resin clip is engaged with the vessel as shown in FIG. 6(B).

<Effect of Resin Clip 20C>

In the room lamp 100 for the motor vehicle obtained in such a way, even when a downward force is applied due to the tare weight of the lamp assembly 40, since the side protruding piece 20S of the protruding piece 20T is located in the engaging recessed part 55S of the opening peripheral edge 56 of the vessel 20S, the resin clip 20 cannot be opened outward. As a result, the lamp assembly 40 is prevented from being hung downward.

Further, since the lamp assembly 40 is prevented from being hung downward, a back lash of the ceiling of the vehicle and the roof panel 50 can be suppressed.

As described above, according to the present invention, the metal mold having a slide structure, which is a problem of a usual device, does not need to be used and an excessive displacement of the housing due to the hung down state of the housing as a problem of the invention of the related art can be prevented.

What is claimed is:

1. A room lamp for a motor vehicle, including:
a lamp assembly having a housing and a resin clip;
a vessel having an opening; and
a reinforcing member, wherein the resin clip is engaged with a peripheral edge of the reinforcing member through the opening of the vessel to integrally attach the lamp assembly, the vessel and the reinforcing member,
the resin clip is formed generally in an inverted U shape, made of an elastic member and includes a base part connected to the housing, an inverted U shape part connected to the base part and a lock connected to the inverted U shape part,
the resin clip has a protruding piece in a lower part of the lock,
a side protruding piece is formed in a lower part side of the protruding piece, and
the protruding piece is located in an engaging recessed part of an opening peripheral edge of the vessel and the side protruding piece abuts against a clip abutting surface of the vessel in a direction of outward displacement of the resin clip when the resin clip is engaged with the peripheral edge of the reinforcing member.

2. The room lamp for a motor vehicle according to claim 1, wherein the side protruding piece is located in a lower side of an arm forming the engaging recessed part.

3. The room lamp for a motor vehicle according to claim 2, wherein the clip abutting surface is formed in the lower side of the arm.

* * * * *